United States Patent
Gan et al.

(10) Patent No.: US 12,010,105 B2
(45) Date of Patent: Jun. 11, 2024

(54) CONTROL METHOD, APPARATUS, AND SYSTEM

(71) Applicant: Huawei Technologies Co., Ltd., Shenzhen (CN)

(72) Inventors: Lu Gan, Xi'an (CN); Xiaoshuang Ma, Beijing (CN); Jianhao Huang, Shenzhen (CN); Chao He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 17/684,820

(22) Filed: Mar. 2, 2022

(65) Prior Publication Data

US 2022/0272077 A1 Aug. 25, 2022

Related U.S. Application Data

(63) Continuation of application No. PCT/CN2020/127760, filed on Nov. 10, 2020.

(30) Foreign Application Priority Data

Nov. 13, 2019 (CN) .......................... 201911105590.3

(51) Int. Cl.
*H04L 9/40* (2022.01)
*G06F 21/53* (2013.01)

(52) U.S. Cl.
CPC .......... *H04L 63/0442* (2013.01); *G06F 21/53* (2013.01); *H04L 63/0407* (2013.01); *H04L 63/08* (2013.01); *H04L 63/18* (2013.01)

(58) Field of Classification Search
None
See application file for complete search history.

(56) References Cited

U.S. PATENT DOCUMENTS 10,382,203 B1 * 8/2019 Loladia .................. H04L 63/06
2015/0249672 A1 * 9/2015 Burns .................. G06F 21/629
726/4

(Continued)

FOREIGN PATENT DOCUMENTS

CN 105827691 A 8/2016
CN 107277061 A 10/2017

(Continued)

OTHER PUBLICATIONS

Tomanek, Ondrej et al., "Security and Privacy of Using AllJoyn IoT Framework at Home and Beyond", IEEE 2016, 6 pages. (Year: 2016).*

(Continued)

*Primary Examiner* — Michael Pyzocha
(74) *Attorney, Agent, or Firm* — Conley Rose, P.C.

(57) ABSTRACT

A first device and a home hub have a same TEE platform, and a second device and the home hub have different TEE platforms. A control method includes the home hub receiving an identity credential of the second device and public key information of the first device from the second device. The home hub controls an IoT device based on the identity credential of the second device. The home hub receives private key information that is of the first device and that is from the first device. The home hub forms an identity credential of the first device based on the public key information of the first device and the private key information of the first device to control the IoT device.

20 Claims, 7 Drawing Sheets

(56) References Cited

U.S. PATENT DOCUMENTS

| | | | |
|---|---|---|---|
| 2016/0112260 A1* | 4/2016 | Pai | H04L 63/10 709/222 |
| 2016/0112434 A1* | 4/2016 | Chung | H04L 63/0807 726/4 |
| 2016/0330182 A1* | 11/2016 | Jeon | A43B 3/34 |
| 2016/0366157 A1 | 12/2016 | Smith et al. | |
| 2017/0055148 A1* | 2/2017 | Zimmerman | H04L 63/0428 |
| 2018/0139286 A1 | 5/2018 | Jia et al. | |
| 2018/0212970 A1* | 7/2018 | Chen | H04L 9/3236 |
| 2018/0227279 A1* | 8/2018 | Kim | H04W 12/069 |
| 2019/0080091 A1* | 3/2019 | Kim | H04L 63/123 |
| 2019/0230063 A1 | 7/2019 | McCready et al. | |
| 2019/0295547 A1 | 9/2019 | Gandhi et al. | |
| 2019/0357023 A1* | 11/2019 | Park | H04W 84/18 |
| 2020/0259667 A1* | 8/2020 | Garnier | H04L 67/12 |
| 2020/0322170 A1 | 10/2020 | Jin | |
| 2020/0374149 A1* | 11/2020 | Bernal Barros | H04L 67/12 |
| 2021/0036999 A1 | 2/2021 | Jin | |
| 2021/0165701 A1* | 6/2021 | Fujino | G06F 21/6281 |
| 2021/0218740 A1* | 7/2021 | Xu | H04L 63/102 |
| 2021/0329451 A1* | 10/2021 | Jun | H04L 63/0853 |
| 2022/0272077 A1 | 8/2022 | Gan et al. | |
| 2022/0329409 A1* | 10/2022 | Collinge | G16Y 40/30 |

FOREIGN PATENT DOCUMENTS

| | | |
|---|---|---|
| CN | 107370597 A | 11/2017 |
| CN | 107919962 A | 4/2018 |
| CN | 108076011 A | 5/2018 |
| CN | 108604260 A | 9/2018 |
| CN | 109714360 A | 5/2019 |
| CN | 109936547 A | 6/2019 |
| CN | 110324276 A | 10/2019 |
| CN | 110336788 A | 10/2019 |
| CN | 110392014 A | 10/2019 |
| CN | 110445774 A | 11/2019 |
| CN | 111049799 A | 4/2020 |
| EP | 3313050 B1 | 1/2019 |
| IN | 107124433 A | 9/2017 |
| WO | 2019127397 A1 | 7/2019 |

OTHER PUBLICATIONS

Pan Heng et al., "A New Accessing and Storing Private Key Scheme," Computer Applied Research, Issue. 10, 2005, with the English Abstract, 4 pages.

Feng Hao, "On Robust Key Agreement Based on Public Key Authentication," In: "Advances in Databases and Information Systems", Jan. 1, 2010, Springer International Publishing, Cham 032682, XP055585485, 10 pages.

* cited by examiner

CONTROL METHOD, APPARATUS, AND SYSTEM

CROSS-REFERENCE TO RELATED APPLICATIONS

This application is a continuation of International Application No. PCT/CN2020/127760 filed on Nov. 10, 2020, which claims priority to Chinese Patent Application No. 201911105590.3 filed on Nov. 13, 2019. The disclosures of the aforementioned applications are hereby incorporated by reference in their entireties.

TECHNICAL FIELD

The present disclosure relates to the field of internet of things technologies, and in particular, to a control method, apparatus, and system.

BACKGROUND

Generally, an internet of things (IoT) solution includes an IoT device and an IoT application that is used to control the IoT device. With rapid growth of IoT devices and IoT applications, controlling security of the IoT devices attracts increasing attention.

Generally, an IoT application may be an APP. A control device loaded with the IoT application is directly connected to an IoT device by using a communications technology such as Wi-Fi, Zigbee, or Bluetooth low energy (BLE), or forwards, through an IoT cloud, a control message to an IoT device that can be directly connected to the internet. However, if the IoT device is directly connected to the IoT cloud, the IoT device is exposed to a public network, increasing a risk of being attacked.

In the current technology, to resolve the foregoing problem, a home hub (usually a permanently home-mounted device, such as a television, a sound box, a router, or an IoT gateway) is added. The home hub is locally connected to the IoT device by using the communications technology such as Wi-Fi, Zigbee, or BLE, and then is connected to the control device through near field or remote communication. In this way, the IoT device is isolated from the public network, reducing the risk that the IoT device is attacked. In a process of establishing a binding relationship between the control device and the home hub, the control device and the home hub establish a near-end security channel by using a PAKE protocol, and then the control device sends, to the home hub through the near-end security channel, a public-private key pair used to control the IoT device, so that the home hub can use an identity of the control device as a proxy to control the IoT device.

Currently, all terminal vendors construct, based on a secure element (SE) and a trusted execution environment (TEE), security capabilities (such as fingerprint recognition, password processing, data encryption and decryption, and security authentication) on their own terminal devices, so that the terminal devices can securely implement functions such as mobile payment and fingerprint unlocking, and isolate sensitive operations at a program execution environment level, to avoid privacy data and sensitive operations being cracked. These terminal vendors are also IoT solution providers. These terminal vendors have their own TEE platforms and can construct, on their own terminals, hardware-based control devices for IoT devices, to further improve IoT security. However, none of these providers open the TEE platform to a third-party IoT application vendor.

When the IoT application is installed on a control device of a same vendor brand as the home hub, the control device generates a set of identity credential (such as a public-private key pair) for pairing during a connection process of the home hub. When the IoT application is installed on a control device of a different vendor brand from the home hub, because a third-party brand control device does not have an SE-based protection capability, if the third-party brand control device still uses the foregoing set of identity credential, a key in the identity credential may be cracked on the third-party brand control device. Therefore, using a same identity credential for control devices of different vendor brands poses a great risk.

SUMMARY

To overcome the foregoing problem, embodiments of this application provide an identity permission escalation method, apparatus, and system.

To achieve the foregoing objective, the following technical solutions are used in the embodiments of this application:

According to a first aspect, this application provides a control method, where a first device and a home hub have a same trusted execution environment TEE platform, a second device and the home hub have different TEE platforms, and the method includes:

The second device sends an identity credential of the second device and public key information of an identity credential of the first device to the home hub, where the identity credential of the second device includes public key information of the second device and private key information of the second device; the home hub controls at least one IoT device based on the identity credential of the second device; the first device sends private key information of the identity credential of the first device to the home hub; and the home hub controls the at least one IoT device based on the identity credential that is of the first device and that is formed by the public key information of the first device and the private key information of the first device.

In this embodiment of this application, the second device configures a set of identity credential in the home hub, so that the second device is bound to the home hub and controls the IoT device through the home hub. When the first device is subsequently connected to the home hub, the first device configures another set of identity credential in the home hub, so that the first device controls the IoT device through the home hub. When a user controls the IoT device by using both the first device that is on the same TEE platform as the home hub and the second device that is on a different TEE platform from the home hub, the home hub may preferably use the identity credential of the first device with a higher permission, so that the first device controls the IoT device, to elevate a control permission of the home hub.

In another possible implementation, before the home hub receives the identity credential of the second device and the public key information of the identity credential of the first device that are sent by the second device, the method further includes: The second device initiates a PAKE protocol negotiation to the home hub, and then the home hub establishes a secure encrypted channel with the second device. That the home hub receives the identity credential of the second device and the public key information of the identity credential of the first device that are sent by the second device includes: The second device sends, through the secure encrypted channel, the identity credential of the second device and the public key information of the identity credential of the first device that are encrypted to the home hub.

In this application, after the second device initiates the PAKE protocol negotiation, a secure channel is established with the home hub, to protect security of sending information between the second device and the home hub.

In another possible implementation, the method further includes: The home hub decrypts the identity credential of the second device and the public key information of the identity credential of the first device, and then stores, in a secure storage unit in the home hub, the identity credential of the second device and the public key information of the identity credential of the first device that are decrypted.

In this application, because the secure storage unit is unchangeable, the received identity credential of the second device and public key information of the first device are stored in the secure storage unit, to ensure that data is not tampered with.

In another possible implementation, before the home hub receives private key information that is of the identity credential of the first device and that is sent by the first device, the method further includes: The first device initiates an STS protocol negotiation to the home hub. The home hub attempts to verify an identity of the first device by using the public key information that is of the identity credential of the first device and that is received from the second device. When the home hub verifies that the first device is a device corresponding to the public key information that is of the identity credential of the first device and that is received from the second device, the home hub establishes a secure encrypted channel with the first device. That the home hub receives private key information that is of the identity credential of the first device and that is sent by the first device includes: The first device sends, through the secure encrypted channel, the encrypted private key information of the identity credential of the first device to the home hub.

In this application, in a process of establishing a secure channel between the home hub and the first device, whether the identity of the first device is the first device corresponding to the received public key information of the first device is first verified, to prevent an unauthorized connection to another device. After the identity of the first device that establishes the secure channel is determined, the secure channel is established, to protect security of information sent between the first device and the home hub.

In another possible implementation, the method further includes: decrypting the private key information of the first device, and then storing the decrypted private key information in a secure storage unit in the home hub.

According to a second aspect, this application provides a control apparatus, and the apparatus performs any one of the embodiments that may be implemented in the first aspect.

According to a third aspect, this application provides a control method, where a first device and a home hub have a same trusted execution environment TEE platform, a second device and the home hub have different TEE platforms, and the method includes:

The first device sends an identity credential of the first device and an identity credential of the second device to the home hub, or sends the identity credential of the first device and public key information of the identity credential of the second device. The identity credential includes public key information and private key information. The home hub controls at least one IoT device based on the identity credential of the first device.

In this embodiment of this application, the first device configures a set of identity credential in the home hub, so that the first device is bound to the home hub and controls the IoT device through the home hub. In a subsequent special case, the second device configures another set of identity credential in the home hub, so that the second device controls some special IoT devices through the home hub.

In another possible implementation, before the home hub receives the identity credential of the first device, and the identity credential of the second device or the public key information of the identity credential of the second device that are sent by the first device, the method further includes: After the first device initiates a PAKE protocol negotiation to the home hub, the home hub establishes a secure encrypted channel with the first device. That the home hub receives the identity credential of the first device, and the identity credential of the second device or the public key information of the identity credential of the second device that are sent by the first device includes: The first device sends, through the secure encrypted channel to the home hub, the identity credential of the first device and the identity credential of the second device that are encrypted, or the identity credential of the first device and the public key information of the identity credential of the second device that are encrypted.

In this application, after the first device initiates the PAKE protocol negotiation, a secure channel is established with the home hub, to protect security of information sent between the first device and the home hub.

In another possible implementation, the method further includes: The home hub decrypts the identity credential of the first device and the identity credential of the second device, or the identity credential of the first device and the public key information of the identity credential of the second device, and then stores, in a secure storage unit in the home hub, the identity credential of the first device and the identity credential of the second device, or the identity credential of the first device and the public key information of the identity credential of the second device that are decrypted.

In this application, because the secure storage unit is unchangeable, the received identity credential of the first device and identity credential (or public key information) of the second device are stored in the secure storage unit, to ensure that data is not tampered with.

In another possible implementation, when the home hub receives the identity credential of the first device and the public key information of the identity credential of the second device that are sent by the first device, the method further includes: The second device sends the private key information of the identity credential of the second device to the home hub; and the home hub controls the at least one IoT device based on the identity credential that is of the second device and that is formed by the public key information of the second device and the private key information of the second device.

In this embodiment of this application, when the identity credential of the first device and the public key information of the second device are received, the home hub includes only the public key information of the second device. Therefore, the private key information of the second device is further required to form the identity credential of the second device.

In another possible implementation, before the home hub receives the private key information that is of the identity credential of the second device and that is sent by the second device, the method further includes: The second device initiates an STS protocol negotiation to the home hub. The home hub attempts to verify an identity of the second device by using the public key information that is of the identity credential of the second device and that is received from the first device. When the home hub verifies that the second device is a device corresponding to the public key information that is of the identity credential of the second device and that is received from the first device, the home hub establishes a secure encrypted channel with the second device. That the home hub receives the private key information that is of the identity credential of the second device and that is sent by the second device includes: The second device sends, through the secure encrypted channel, the encrypted private key information of the identity credential of the second device to the home hub.

In this application, in a process of establishing a secure channel between the home hub and the second device, whether the identity of the second device is the second device corresponding to the received public key information of the second device is first verified, to prevent an unauthorized connection to another device. After the identity of the second device that establishes the secure channel is determined, the secure channel is established, to protect security of sending information between the second device and the home hub.

In another possible implementation, the method further includes: decrypting the private key information of the second device, and then storing the decrypted private key information in a secure storage unit in the home hub.

According to a fourth aspect, this application provides a control apparatus, and the apparatus performs any one of the embodiments that may be implemented in the third aspect.

According to a fifth aspect, this application provides an electronic device, including a transceiver, a processor, and a memory. The transceiver is configured to receive and send data; the memory stores one or more programs, the one or more programs include instructions, and when the instructions are executed by the processor, the electronic device is enabled to perform any one of the embodiments that may be implemented in the first aspect or any one of the embodiments that may be implemented in the third aspect.

According to a sixth aspect, this application provides an identity permission escalation system, including a first device, a home hub, and at least one IoT device. The first device and the home hub have a same trusted execution environment TEE platform. The second device sends a secure channel establishment protocol to the home hub, and the home hub establishes a secure channel with the second device. The second device and the home hub have different trusted execution environment TEE platforms. The secure channel establishment protocol is sent to the home hub when the second device logs in to an IoT application program for the first time. The IoT application program is used to control the home hub and the at least one IoT device. The second device sends, through the secure channel to the home hub, an identity credential of the second device and public key information of an identity credential of the first device. The home hub controls the at least one IoT device based on the received identity credential of the second device. The first device logs in to the IoT application program. When the first device logs in to the IoT application program, the home hub attempts to verify an identity of the first device based on the received public key information of the identity credential of the first device, and after confirming the identity of the first device, the home hub receives private key information that is of the identity credential of the first device and that is sent by the first device. The home hub controls the at least one IoT device based on the identity credential of the first device. The identity credential of the first device includes the public key information of the identity credential of the first device and the private key information of the identity credential of the first device.

In another possible implementation, that the home hub controls the at least one IoT device based on the identity credential of the second device or the identity credential of the first device includes: After receiving a control instruction sent by the second device or the first device, the home hub controls the at least one IoT device based on the identity credential of the second device or the identity credential of the first device and according to the control instruction.

According to a seventh aspect, this application provides an identity permission escalation system, including a first device, a home hub, and at least one IoT device. The first device and the home hub have a same trusted execution environment TEE platform. When the first device logs in to an IoT application program for the first time, the first device sends a secure channel establishment protocol to the home hub. The home hub establishes, according to the received secure channel establishment protocol, a secure channel with the first device. The first device sends, through the secure channel to the home hub, an identity credential of the first device and an identity credential of the second device. The second device and the home hub have different TEE platforms. The home hub controls the at least one IoT device based on the received identity credential of the first device. When the second device logs in to the IoT application program, the home hub attempts to verify an identity of the second device based on received public key information of the identity credential of the second device, and after confirming the identity of the second device, the home hub controls the at least one IoT device based on the identity credential of the second device.

In another possible implementation, that the home hub controls the IoT device based on the identity credential of the first device or the identity credential of the second device includes: After receiving a control instruction sent by the first device or the second device, the home hub controls the at least one IoT device based on the identity credential of the first device or the identity credential of the second device and according to the control instruction.

According to an eighth aspect, this application provides a readable storage medium, configured to store instructions. When the instructions are executed, any one of the embodiments that may be implemented in the first aspect or any one of the embodiments that may be implemented in the third aspect is implemented.

According to a ninth aspect, this application provides a computer program device including instructions. When the computer program device is run on a terminal, the terminal is enabled to perform any embodiment that may be implemented in the first aspect or any embodiment that may be implemented in the third aspect.

DESCRIPTION OF EMBODIMENTS

The following describes the technical solutions in embodiments of this application with reference to accompanying drawings in the embodiments of this application.

Figure 1:
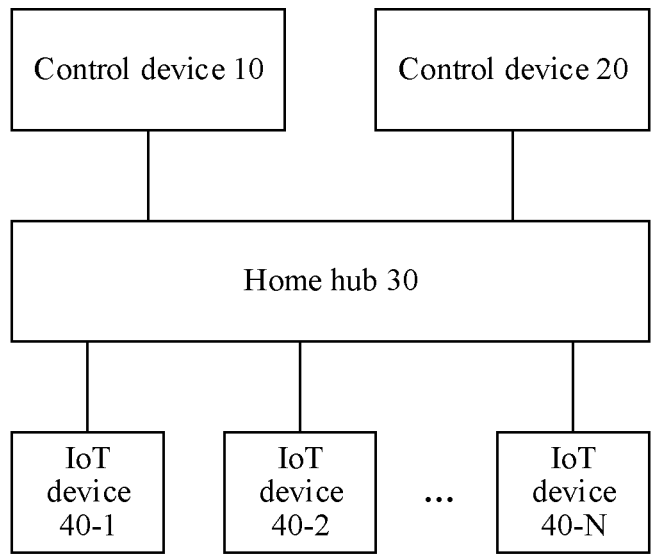
FIG. 1 is a schematic structural diagram of a control system according to an embodiment of this application.

FIG. 1 is a schematic structural diagram of an identity permission escalation system according to an embodiment of this application. As shown in FIG. 1, the system provided in this application includes a control device 10, a control device 20, a home hub 30, and N IoT devices 40. The home hub 30 is connected to each IoT device 40 by using a near field communications technology such as Wi-Fi, Zigbee, or BLE, and is connected to the control device 10 and the control device 20 by using a near field or remote communications technology.

The control device 10 is deployed (installed) with an IoT application program used to control the home hub 30 and the IoT device 40, controls statuses of the home hub 30 and the IoT device 40 by using the near field or remote communications technology, and receives status events reported by the home hub 30 and the IoT device 40. The IoT application program may be a software program such as an applet or an APP. The control device 10 may control the IoT device 40 through the home hub 30. It should be noted that one IoT application program may control a plurality of IoT devices 40, and may control the home hub 30. It may be understood that the home hub 30 is also an IoT device, and is an IoT device with a central capability.

The control device 10 is a device that has a same TEE platform as the home hub 30. It should be noted that the IoT application program and the home hub 30 have a same TEE platform. In an embodiment that may be implemented, the control device 10, the home hub 30, and the IoT application program are all produced by a same device vendor. Devices or application programs produced by the device vendor are all based on a same TEE platform. The control device 10 may construct, on the TEE platform, a hardware-based IoT device 40 to control a secure application, to improve IoT security.

The control device 20 is also deployed (installed) with an IoT application program used to control the IoT device 40, controls statuses of the IoT device 40 by using the near field or remote communications technology, and receives status events reported by the IoT device 40.

The control device 20 is a device that has a different TEE platform from the home hub 30, or the control device 20 is a device that does not have a TEE platform. In an embodiment that may be implemented, the control device 20 and the home hub 30 belong to different device vendors, and in this case, the control device 20 is referred to as a device produced by a third-party device vendor. Because each device vendor does not open the TEE platform to another device vendor, the IoT application program deployed on the control device 20 can use only a basic security capability interface (for example, an interface such as Keystore on Android or Keychain on iOS) provided by an operating system to protect sensitive information.

It should be specially noted that the control device 10 and the control device 20 may include but are not limited to mobile devices such as a mobile phone, a tablet computer, and a notebook computer.

The home hub 30 is locally connected to the IoT device 40 by using a near-end communications technology, and then is connected to the control device 10 and the control device 20 through near field or remote communication. In this way, the IoT device 40 is isolated from the internet, reducing a risk that the IoT device 40 is attacked. In a process of establishing a binding relationship between the control device 10 or the control device 20 and the home hub 30, an identity credential that is of the control device 10 or the control device 20 and that is used to control the IoT device 40 is sent to the home hub 30, so that the home hub 30 uses an identity of the control device as a proxy to control the IoT device 40.

It should be specially noted that the home hub 30 is generally a resident device deployed at home, and may include but is not limited to a device such as a television, a sound box, a router, or a gateway. The home hub 30 may simultaneously control a plurality of IoT devices 40.

The IoT device 40 is an intelligent device having an internet of things function. Generally, an IoT application program may be used to perform local control (controlled by the IoT device on which the IoT application is installed) or remote control (controlled by the control device on which the IoT application is installed) on the IoT device, and report a status change event.

It should be specially noted that the IoT device 40 may include but is not limited to devices such as an intelligent camera, a door lock, an air conditioner, a sound box, a television, a light, and a sweeping robot.

According to the system provided in this embodiment of this application, under a same account, the control device 10 not only has an identity credential (a public-private key pair) of the control device 10, but also has an identity credential of the control device 20 or public key information of the identity credential of the control device 20. When the control device 10 is bound (which may also be referred to as pairing), at near end, to the home hub 30, after the control device 10 sends the identity credential of the control device 10 and the identity credential of the control device 20 to the home hub 30 (or the control device 10 sends the identity credential of the control device 10 and the public key information of the identity credential of the control device 20 to the home hub 30), the control device 10 can control the IoT device 40 through the home hub 30. It should be noted that when the control device uses an account (for example, an account A) to log in to the IoT application for the first time, the IoT application detects a TEE platform of the control device, and determines whether the control device and the IoT application have a same TEE platform (or determines whether the control device and the IoT application have a same vendor). If it is detected that the control device is the control device 10 (that is, a same TEE platform or a same vendor), the control device 10 locally generates the identity credential of the control device 10 under the account, and uploads the identity credential to an IoT server. If it is detected that the control device is the control device 20 (that is, different TEE platforms or different vendors), the control device 20 locally generates the identity credential of the control device 20 under the account, and uploads the identity credential to the IoT server.

After the control device 10 reports the identity credential of the control device 10 to the server, when the control device 20 logs in to the IoT application program by using the same account (the account A), the control device 20 may obtain public key information of the control device 10 from the server. Similarly, after the control device 20 reports the identity credential of the control device 20 to the server, when the control device 10 logs in to the IoT application program by using the same account (the account A), the control device 10 may obtain the identity credential (public and private key information) or the public key information of the control device 20 from the server.

Subsequently, when the control device 20 is connected to the home hub 30, identity authentication is performed by using the originally configured public key information of the identity credential of the control device 20, to receive private key information sent by the control device 20, so that the home hub 30 has both the identity credential of the control device 10 bound to the device and the identity credential of the control device 20. In this case, both the control device 10 and the control device 20 can control the IoT device 40 through the home hub 30.

Similarly, the control device 20 not only has the identity credential (a public-private key pair) of the control device 20, but also may have the public key information of the identity credential of the control device 10. When the control device 20 is bound, at near end, to the home hub 30, the control device 20 sends the identity credential of the control device 20 and the public key information of the identity credential of the control device 10 to the home hub 30, so that the control device 20 can control the IoT device 40 through the home hub 30. It should be noted that the home hub 30 is generally bound to the control device only once. To be specific, if the control device 10 is first bound to the home hub 30, the control device 20 is subsequently not bound to the home hub 30, but is directly connected to the home hub. If the control device 20 is first bound to the home hub 30, the control device 10 is subsequently not bound to the home hub 30, but is directly connected to the home hub.

Subsequently, when the control device 10 is connected to the home hub 30, identity authentication is performed by using the originally configured public key information of the identity credential of the control device 10, to receive private key information sent by the control device 10, so that the home hub 30 has both the identity credential of the control device 20 bound to the device and the identity credential of the control device 10. In this case, both the control device 10 and the control device 20 can control the IoT device 40.

In addition, the home hub 30 stores the identity credential of the control device 10 and the identity credential of the control device 20. Because the identity credential of the control device 10 is protected based on the same TEE platform as the home hub 30, a leakage risk is low, and security is higher. Therefore, a permission of the control device 10 is higher than a permission of the control device 20.

When the low-permission control device 20 is bound to the home hub 30, to improve an identity permission of the home hub 30, the home hub 30 is preferably connected to the control device 10, to avoid that the identity permission of the home hub 30 cannot reach a level of the control device 10 because a device bound to the control device 20 is used.

The permission in this embodiment of this application may have a plurality of understandings.

For example, an understanding of the permission is as follows: The home hub 30 has a plurality of control permissions, and the home hub 30 may open all the control permissions to the control device 10, and open only some control permissions to the control device 20. In other words, the control device 10 can use all control functions of the home hub 30, and the control device 20 can use only some control functions of the home hub 30. For example, some high-permission functions of the home hub 30 are opened only to the control device 10, but not to the control device 20. These high-permission functions are, for example, functions such as authorizing a family member to use the home hub 30, controlling a permission of a family member, and creating an automation rule to control the IoT device 40. Some low-permission functions (for example, simple control or view) may be opened to both the control device 10 and the control device 20. The home hub 30 may identify, by using a security credential, whether the control device and the home hub 30 have a same TEE platform, that is, identify which is the control device 10 and which is the control device 20. Then, based on a preset rule, different permissions are opened to different control devices.

Another understanding of the permission is as follows: The control device 10 has both the identity credential (the public-private key pair) of the control device 10 and the identity credential (the public-private key pair) of the control device 20. The control device 20 does not have a private key of the control device 10. Therefore, the control device 10 can not only control the IoT device 40 bound to the control device 10, but also control the IoT device 40 bound to the control device 20. The control device 20 can control only the IoT device 40 bound to the control device 20, but cannot control the IoT device 40 bound to the control device 10. That is, the control device 10 can control all IoT devices 40, and the control device 20 can control only an IoT device 40 bound to the control device 20. It should be noted that each IoT device 40 is bound to the control device only once. After the binding, the control device sends an identity credential of the control device to the IoT device 40, and the identity credential is subsequently used when the control device communicates with the IoT device 40. Because the control device 10 has both the identity credential of the control device 10 and the identity credential of the control device 20, the control device 10 has a high permission to control all IoT devices 40. However, the control device 20 does not have the private key of the control device 10. Therefore, the control device 20 has a low permission, and cannot control the IoT device 40 bound to the control device 10.

According to the identity permission escalation system provided in this embodiment of this application, control devices are classified into two types based on whether the control device and the home hub 30 have a same TEE platform, and identity credentials of the two types of control devices are stored in the home hub 30, to ensure that different types of control devices use their own identity credentials, to avoid a security problem caused by leakage of private key information of a peer. In addition, when the home hub 30 has two sets of identity credential, the home hub 30 may preferably use an identity credential of a control device with a higher permission (on a same TEE platform as the home hub 30).

In this embodiment of this application, two cases in which the home hub 30 is separately bound to the control device 10 and the control device 20 are considered, and the following two embodiments are used to describe a binding process.

Figure 2:
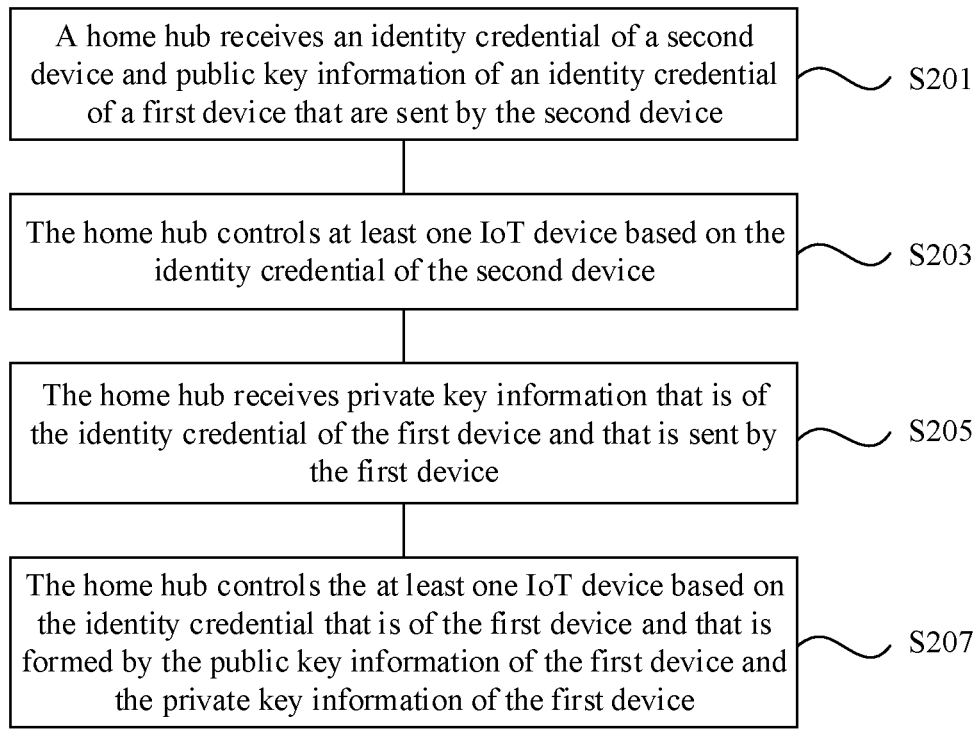
FIG. 2 is a flowchart of a control method according to an embodiment of this application.

FIG. 2 is a flowchart of a control method according to an embodiment of this application. As shown in FIG. 2, specific implementation steps of the control method provided in this application are as follows:

Step S201: A home hub receives an identity credential of a second device and public key information of an identity credential of a first device that are sent by the second device.

When the home hub is bound to the second device, the second device sends the identity credential of the second device and the public key information of the identity credential of the first device to the home hub. The second device logs in to an IoT application program by using an account.

Step S203: The home hub controls an IoT device based on the identity credential of the second device.

After the home hub is bound to the second device, the second device can control the IoT device through the home hub. When the home hub controls the IoT device, the home hub communicates with the IoT device by using the identity credential of the second device.

Step S205: The home hub receives private key information that is of the identity credential of the first device and that is sent by the first device.

After the home hub is bound to the second device, when the first device logs in to the IoT application program by using a same account (the same account as the second device), verification may be performed between the home hub and the first device. After the verification succeeds, the first device sends the private key information of the identity credential of the first device to the home hub.

Step S207: The home hub controls the IoT device based on the identity credential that is of the first device and that is formed by the public key information of the first device and the private key information of the first device.

After the home hub receives the private key information of the first device, the first device can control the IoT device through the home hub. In this case, the home hub communicates with the IoT device by using the identity credential of the first device.

In this embodiment of this application, the control device 20 configures a set of identity credential in the home hub 30, so that the control device 20 is bound to the home hub 30 and controls the IoT device 40 through the home hub 30. When the control device 10 is subsequently connected to the home hub 30, the control device 10 configures another set of identity credential in the home hub 30, so that the control device 10 controls the IoT device 40 through the home hub 30. When a user controls the IoT device 40 by using both the control device 10 that is on a same TEE platform as the home hub 30 and the control device 20 that is on a different TEE platform from the home hub 30, the home hub 30 may preferably use the identity credential of the control device 10 with a higher permission, so that the control device 10 controls the IoT device 40, to elevate a control permission of the home hub 30.

Figure 3:
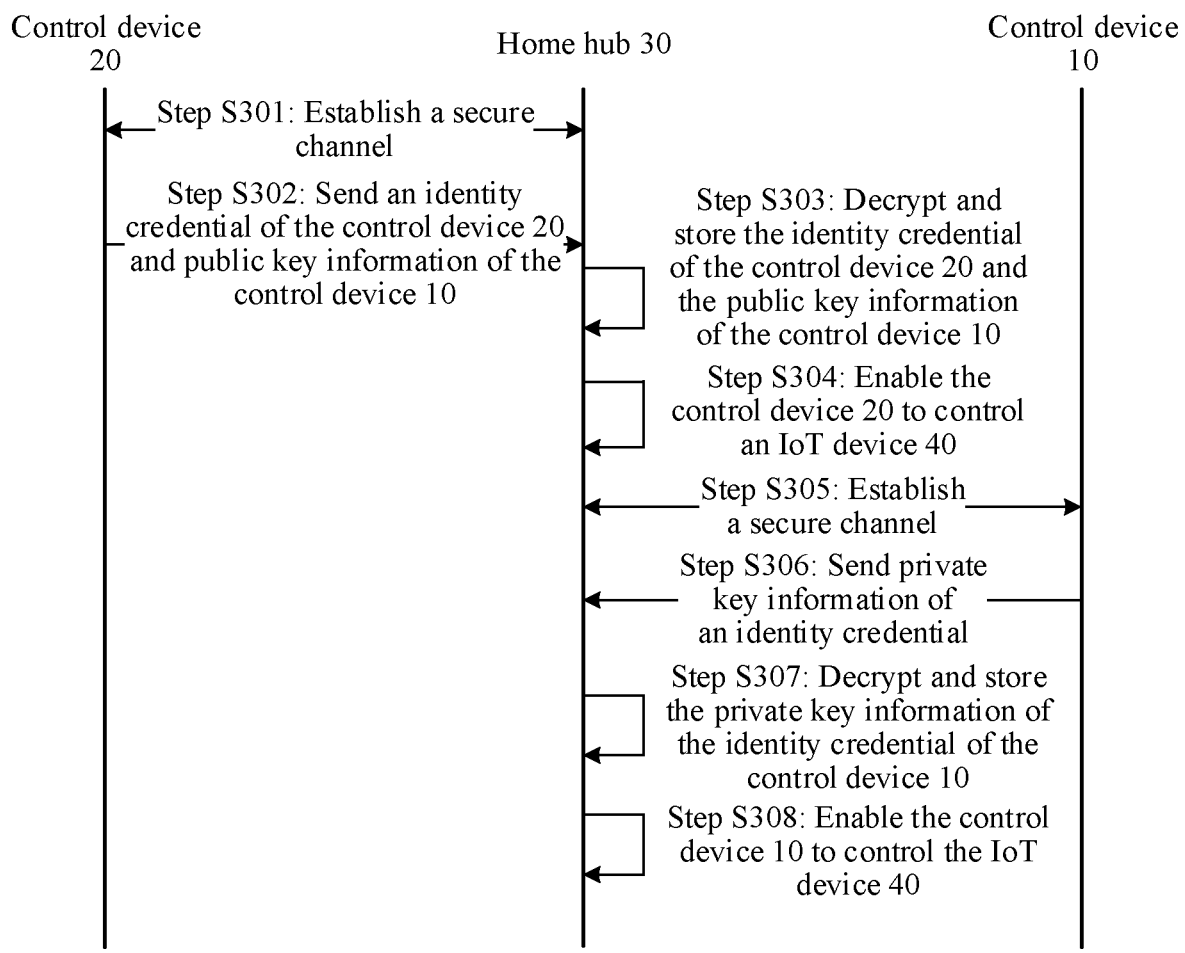
FIG. 3 is a flowchart of a process of binding a first control device and a home hub according to an embodiment of this application.

FIG. 3 is a flowchart of binding a control device and a home hub according to an embodiment of this application. As shown in FIG. 3, a specific process of binding the control device 20 and the home hub 30 is as follows:

Step S301: The control device 20 establishes a secure channel with the home hub 30.

It should be preferably noted that, when a device vendor of the home hub 30 develops an IoT application program (APP) used to control the IoT device 40 through the home hub 30, it is considered that the APP may be installed by a user on the control device 10 of a same device vendor that produces the home hub 30 (that is, the control device 10 and the home hub 30 are protected based on a same TEE platform), or that the APP may be installed by a user on the control device 20 of a different device vendor that produces the home hub 30 (that is, the control device 20 and the home hub 30 are protected based on different TEE platforms). Because different device vendors have different TEE platforms, if control devices produced by all the device vendors use a same identity credential for identity authentication in a process of connecting to the home hub 30, key information of the identity credential is likely to be cracked by the control device 20. Therefore, the device vendor of the home hub 30 enables, by using two sets of identity credential, the control device 10 to perform identity authentication by using one set of identity credential in a process of connecting to the home hub 30, and enables the control device 20 to perform identity authentication by using the other set of identity credential in a process of connecting to the home hub 30.

In this embodiment of this application, before the control device 20 is bound to the home hub 30, a connection needs to be established between the control device 20 and the home hub 30. Because a near field/remote communication connection between the control device 20 and the home hub 30 has a risk of being attacked, a secure channel needs to be established between the control device 20 and the home hub 30, to protect security of sending data between the control device 20 and the home hub 30.

Figure 4:
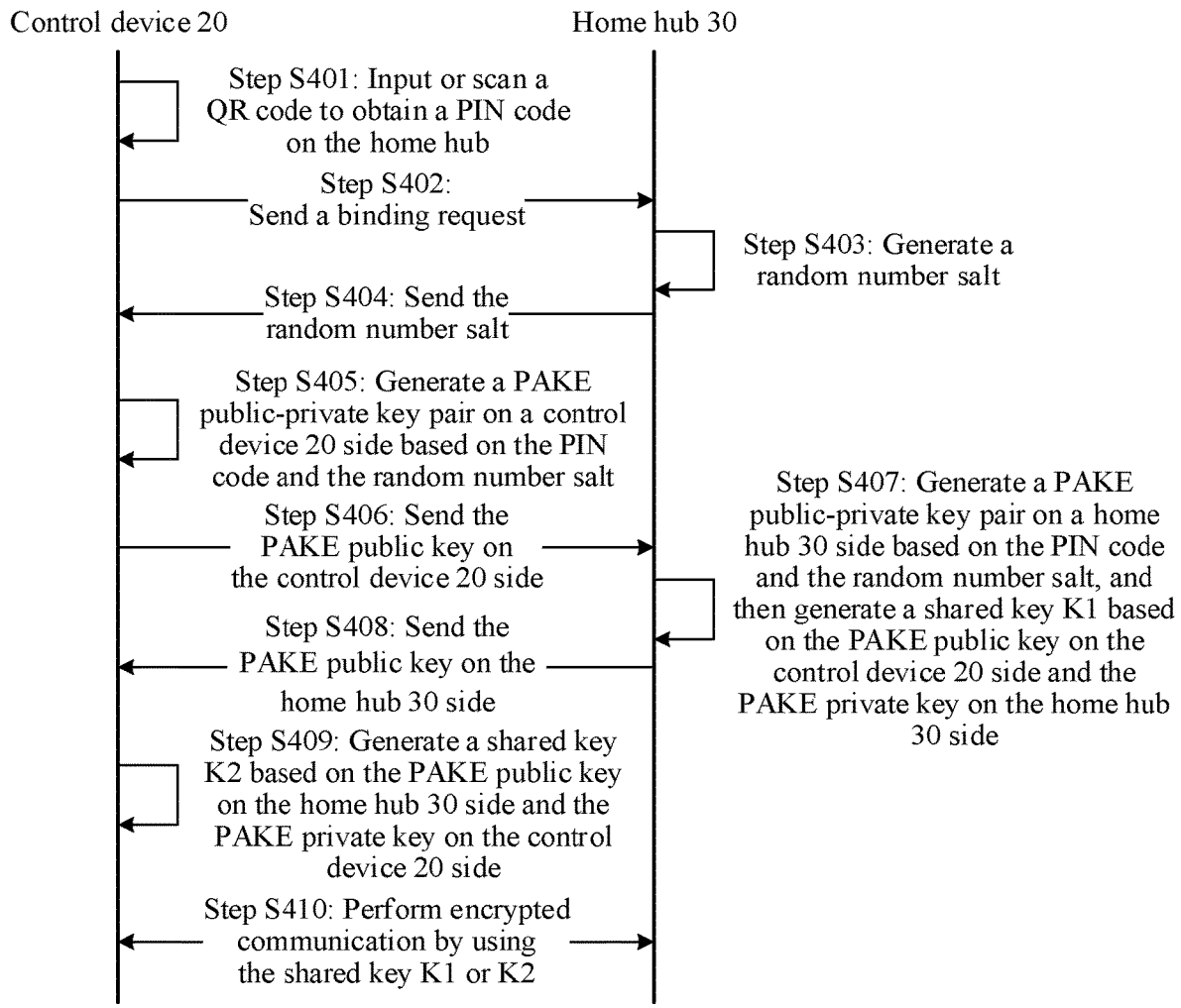
FIG. 4 is a flowchart of a process in which a terminal device and a home hub negotiate to establish a secure channel by using a PAKE protocol.

FIG. 4 is a flowchart of a process in which a control device and a home hub establish a secure channel by using a PAKE protocol. As shown in FIG. 4, a specific process in which the control device 20 and the home hub 30 establish the secure channel by using the PAKE protocol is as follows:

Step S401: The control device 20 obtains a PIN code on the home hub 30 by manually inputting or scanning a quick response (QR) code.

Step S402: The control device 20 sends a binding request to the home hub 30.

Step S403: The home hub 30 generates a random number salt.

Step S404: The home hub 30 sends the random number salt to the control device 20.

Step S405: The control device 20 generates, based on the PIN code and the random number salt, a PAKE public-private key pair on a control device 20 side.

Step S406: The control device 20 sends the PAKE public key on the control device 20 side to the home hub 30.

Step S407: The home hub 30 generates, based on the PIN code and the random number salt, a PAKE public-private key pair on a home hub 30 side, and then generates, based on the PAKE public key on the control device 20 side and the PAKE private key on the home hub 30 side, a shared key K1.

Step S408: The home hub 30 sends the PAKE public key on the home hub 30 side to the control device 20.

Step S409: The control device 20 generates, based on the PAKE public key on the home hub 30 side and the PAKE private key on the control device 20 side, a shared key K2.

Step S410: The control device 20 and the home hub 30 can perform encrypted communication by using the shared key K1 or K2, where the shared key K1 and the shared key K2 are a same key. That is, a secure channel is established between the control device 20 and the home hub 30, and an identity credential may be sent through the secure channel.

In this embodiment of this application, the secure channel is established by using the PAKE protocol, to ensure security of sending data by the control device 20 to the home hub 30.

Step S302: The control device 20 sends an identity credential of the control device 20 and public key information of an identity credential of the control device 10 to the home hub 30 through the secure channel. Specifically, after encrypting the identity credential of the control device 20 and the public key information of the control device 10 by using the shared key K2, the control device 20 sends the encrypted identity credential of the control device 20 and public key information of the control device 10 to the home hub 30.

In this embodiment of this application, before the control device 20 is bound to the home hub 30, the control device 20 obtains public key information of another set of identity credential (that is, the public key information of the control device 10) through an IoT cloud server, to perform identity authentication on a control device when the control device (namely, the control device 10) produced by another device vendor is subsequently connected to the home hub 30.

In this embodiment of this application, after the secure channel is established between the control device 20 and the home hub 30 by using the PAKE protocol, the control device 20 encrypts, by using the key K2, the identity credential to be bound and the public key information of the identity credential of the control device 10, to generate a ciphertext, and then sends the ciphertext to the home hub 30, to ensure security of sending the identity credential by the control device 20 to the home hub 30.

Step S303: The home hub 30 decrypts and stores the identity credential of the control device 20 and the public key information of the identity credential of the control device 10.

After receiving the ciphertext generated through encryption by using the key K2, the home hub 30 needs to decrypt the ciphertext. In this embodiment of this application, the home hub 30 decrypts the ciphertext by using the key K1, to obtain the identity credential of the control device 20 and the public key information of the control device 10. Then, the home hub 30 stores the identity credential of the control device 20 and the public key information of the control device 10 that are obtained after decryption in a secure storage unit, to implement the binding between the control device 20 and the home hub 30.

In this case, the home hub 30 already stores the identity credential of the control device 20, and the home hub 30 may send a control instruction to the IoT device 40, to implement a connection between the control device 20 and the IoT device 40 and control the IoT device 40.

The identity credential of the control device 20 and the public key information of the identity credential of the control device 10 that are stored in the secure storage unit of the home hub 30 cannot be modified, unless information (such as the PIN code) of the IoT device 40 is deleted from the home hub 30 or factory settings are restored.

It should be specially noted that, because the control device 20 and the home hub 30 are devices protected by different TEE platforms, or the control device 20 is a device not protected by a TEE platform, private key information of the identity credential of the control device 20 needs to be protected by a security capability interface of an operating system of the control device 20, for example, an interface such as a Keystore of Android or a Keychain of iOS. Security of this protection is not as high as being protected by the TEE platform. Therefore, in this embodiment of this application, the public key information of the control device 10 is configured on the home hub 30, so that the public key information of the control device 10 on the home hub 30 is not replaced or changed in a subsequent use process of the control device 20. In this way, it is avoided that after the private key information of the control device 20 is leaked, an attacker replaces the public key information of the control device 10 when performing binding, to change the public key information that is of the control device 10 and that is previously configured in the home hub 30.

Step S304: The control device 20 controls the IoT device 40 through the home hub 30.

After the control device 20 is bound to the home hub 30, the home hub 30 already stores the identity credential of the control device 20, and the home hub 30 may use the identity credential of the control device 20 when communicating with the IoT device 40, to implement a connection between the control device 20 and the IoT device 40, control a status of the IoT device 40, and receive a status event reported by the IoT device 40. For example, a specific scenario may be as follows: The control device 20 is a mobile phone, the home hub 30 is a sound box, and the IoT device 40 may be one or more of a light, a camera, or a television. After the mobile phone is bound to the sound box, when the IoT device 40 is locally or remotely controlled through an APP on the mobile phone, the mobile phone does not directly control the IoT device 40, and does not directly control the IoT device 40 through an IoT cloud. Instead, the mobile phone controls the IoT device 40 through the sound box or through the sound box and then through the IoT cloud. That is, the mobile phone directly sends the control instruction to the sound box or the mobile phone sends the control instruction to the sound box through the cloud, and then the sound box controls the IoT device 40.

Step S305: The control device 10 establishes a secure channel with the home hub 30.

In one case, in an early stage, after binding the control device 20 and the home hub 30, the user controls the IoT device 40 through the home hub 30. In a late stage, after the user switches to the control device 10, when the user needs to control the IoT device 40 through the control device 10, step S305 is performed. In another case, after binding the control device 20 and the home hub 30, the user controls the IoT device 40 through the home hub 30, and when the user needs to control the IoT device 40 through the control device 10, step S305 is performed.

In a process in which the home hub 30 is connected to the control device 10, the control device 10 does not need to be bound to the home hub 30 again. As long as the home hub 30 stores the identity credential of the control device 10, the control device 10 can control the IoT device 40 through the home hub 30.

In this embodiment of this application, in a process of transmitting data between the control device 10 and the home hub 30, because the control device 10 and the home hub 30 are connected to the control device through near field/remote communication, there is a risk of being attacked. Therefore, a secure channel needs to be established between the control device 10 and the home hub 30, to protect security of sending data between the control device 10 and the home hub 30.

Figure 5:
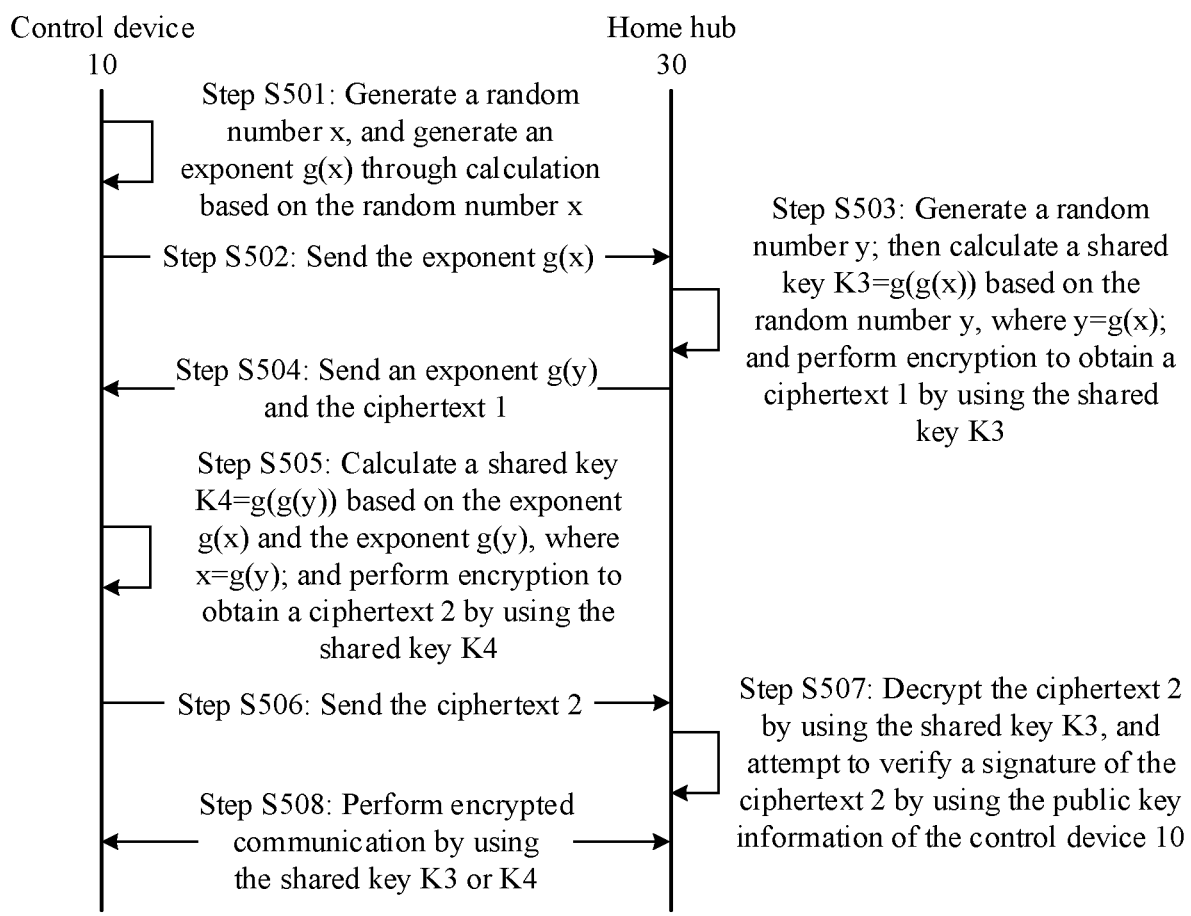
FIG. 5 is a flowchart of a process in which a terminal device and a home hub negotiate to establish a secure channel by using an STS protocol.

FIG. 5 is a flowchart of a process in which a control device and a home hub negotiate to establish a secure channel by using an STS protocol. As shown in FIG. 5, a specific process in which the control device 10 and the home hub 30 negotiate to establish the secure channel by using the STS protocol is as follows:

Step S501: The control device 10 generates a random number x, and generates an exponent g(x) through calculation based on the random number x.

Step S502: The control device 10 sends the exponent g(x) to the home hub 30.

Step S503: The home hub 30 generates a random number y; then generates an exponent g(y) based on the random number y; then calculates a shared key K3=g(g(x)) based on the exponent g(x) and the exponent g(y), where y=g(x); then signs (g(y), g(x)) by using the private key information of the control device 20; and performs encryption to obtain a ciphertext 1 by using the shared key K3.

Step S504: The home hub 30 sends the exponent g(y) and the ciphertext 1 to the control device 10.

Step S505: The control device 10 calculates a shared key K4=g(g(y)) based on the exponent g(x) and the exponent g(y), where x=g(y); then decrypts the ciphertext 1 by using the shared key K4; attempts to verify a signature of the ciphertext 1 by using the public key information of the control device 20; after confirmation, uses the private key information of the identity credential of the control device 10 to sign (g(x), g(y)); and performs encryption to obtain a ciphertext 2 by using the shared key K4.

Step S506: The control device 10 sends the ciphertext 2 to the home hub 30.

Step S507: The home hub 30 decrypts the ciphertext 2 by using the shared key K3, and attempts to verify a signature of the ciphertext 2 by using the public key information of the identity credential of the control device 10.

Step S508: The home hub 30 and the control device 10 can perform encrypted communication by using the shared key K3 or K4, where the shared key K3 and the shared key K4 are a same key. That is, a secure channel is established between the control device 10 and the home hub 30, and an identity credential may be sent through the secure channel.

In this application, in a process of establishing the secure channel by using the STS protocol, the public key information of the identity credential of the control device 10 stored in the secure storage unit in the home hub 30 is used to attempt to verify an identity of the control device that establishes the secure channel with the home hub 30, to determine whether the control device is the control device 10 protected by the same TEE platform as the home hub 30. If the control device is the control device 10 protected by the same TEE platform as the home hub 30, the secure channel is established between the home hub 30 and the control device 10. If the control device is not the control device 10 protected by the same TEE platform as the home hub 30, no secure channel is established between the home hub 30 and the control device.

After the home hub 30 is bound to another control device, in this application, a secure channel is established by using the STS protocol, to ensure security of subsequently sending the private key information by the control device 10 to the home hub 30.

Step S306: The control device 10 sends the private key information of the identity credential of the control device 10 to the home hub 30 through the secure channel. Specifically, the control device 10 may encrypt the private key information of the control device 10 by using the shared key K4, and then send the encrypted private key information to the home hub 30.

In the binding process of the home hub 30, the control device 20 has sent and stored the public key information of the identity credential of the control device 20 in the home hub 30. Therefore, in this case, the control device 10 only needs to send the private key information.

In this embodiment of this application, in a process in which after the secure channel is established between the control device 10 and the home hub 30 by using the STS protocol, and the private key information of the identity credential of the control device 10 is sent to the home hub 30, the control device 10 encrypts the private key information of the identity credential of the control device 10 by using the key K4, to generate a ciphertext, and then sends the ciphertext to the home hub 30, to ensure security of sending the identity credential by the control device 10 to the home hub 30.

Step S307: The home hub 30 decrypts and stores the private key information of the identity credential of the control device 10.

After receiving the ciphertext generated through encryption by using the key K4, the home hub 30 needs to decrypt the ciphertext. In this embodiment of this application, the home hub 30 decrypts the ciphertext by using the key K3, to obtain the private key information of the identity credential of the control device 10. Then, the home hub 30 stores the decrypted private key information of the identity credential of the control device 10 in the secure storage unit, to form the identity credential of the control device 10 in the home hub 30.

Step S308: The control device 10 controls the IoT device 40 through the home hub 30.

When the user logs in with an account only on an APP in the control device 10, the control device 10 controls the IoT device 40 through the home hub 30. If the user logs in with the account on both the APP in the control device 10 and an APP in the control device 20, the home hub 30 stores two sets of identity credential. Because the private key information of the control device 10 is protected and stored based on the same TEE platform as the home hub 30, a security risk of the control device 10 is low. Because the private key information of the control device 20 is protected based on the security capability interface of the operating system, a security risk is higher than that of the control device 10. Therefore, a permission of the identity credential of the control device 10 is higher than that of the identity credential of the control device 20. The home hub 30 may preferably select the identity credential of the control device 10 with a higher identity credential permission, and in this case, the control device 10 controls the IoT device 40.

When the control device 10 elevates a permission of the home hub 30, a display user interface (UI) operation may be performed. In an embodiment that may be implemented, when the control device 10 is connected to the home hub 30, the user is prompted whether to escalate the permission of the home hub 30 to the permission of the control device 10. If the user selects yes, the private key information of the identity credential of the control device 10 is sent to the home hub 30.

In this embodiment of this application, the control device 20 configures a set of identity credential in the home hub 30, and is bound to the home hub 30, so that the control device 20 controls the IoT device 40 through the home hub 30. When the control device 10 is subsequently connected to the home hub 30, the control device 10 configures another set of identity credential in the home hub 30, so that the control device 10 controls the IoT device 40 through the home hub 30. When the user controls the IoT device 40 by using both the control device 10 that is on the same TEE platform as the home hub 30 and the control device 20 that is on a different TEE platform from the home hub 30, the home hub 30 may preferably use the identity credential of the control device 10 with a higher permission, so that the control device 10 controls the IoT device 40, to elevate a control permission of the home hub 30.

Figure 6:
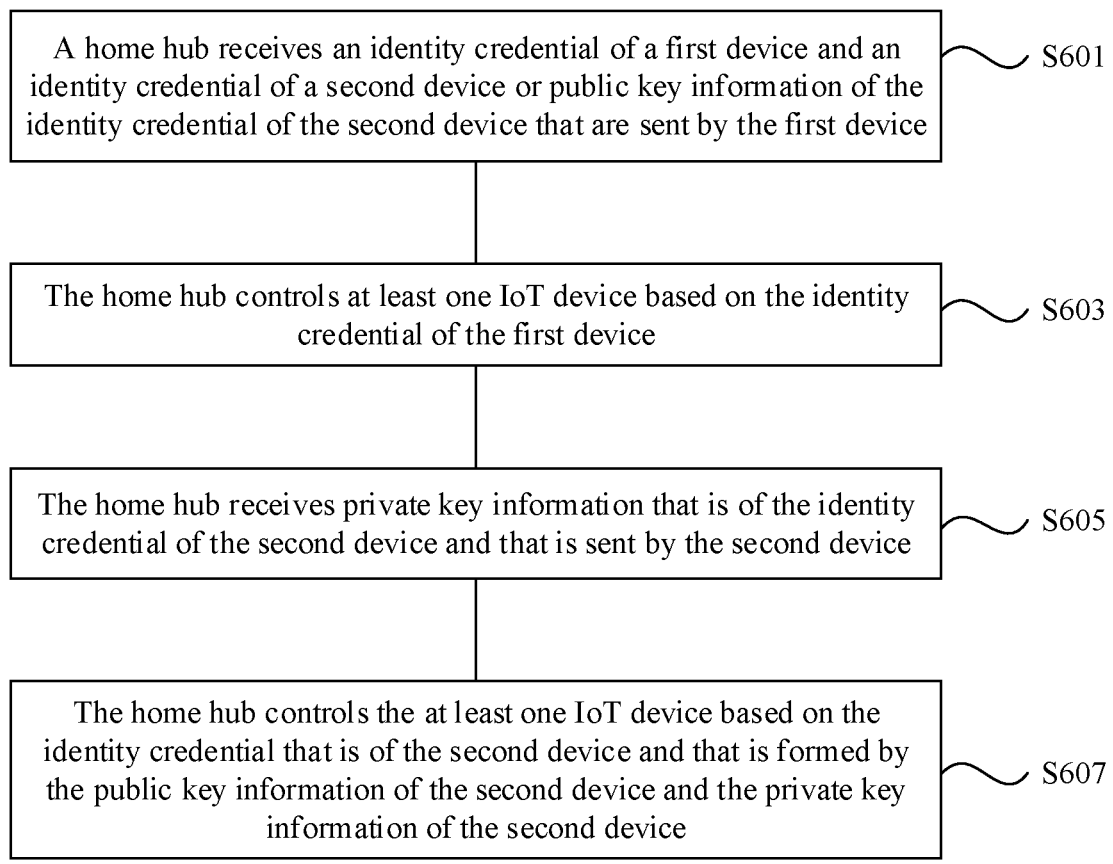
FIG. 6 is a flowchart of another control method according to an embodiment of this application.

FIG. 6 is a flowchart of another control method according to an embodiment of this application. As shown in FIG. 6, specific implementation steps of the control method provided in this application are as follows:

Step S601: A home hub receives an identity credential of a first device and an identity credential of a second device that are sent by the first device, or the home hub receives the identity credential of the first device and public key information of the identity credential of the second device that are sent by the first device.

When the home hub is bound to the first device, the first device sends the identity credential of the first device and the identity credential of the second device (or the public key information of the second device) to the home hub. The first device logs in to an IoT APP by using an account, and then may start to perform a binding action.

Step S603: The home hub controls an IoT device based on the identity credential of the first device.

After the home hub is bound to the first device, the first device can control the IoT device through the home hub. When the home hub controls the IoT device, the home hub communicates with the IoT device by using the identity credential of the first device.

Step S605: The home hub receives private key information that is of the identity credential of the second device and that is sent by the second device.

After the home hub is bound to the first device, when the second device logs in to the IoT APP by using a same account (the same account as the first device), verification may be performed between the home hub and the second device. After the verification succeeds, the second device sends the private key information of the identity credential of the second device to the home hub.

Step S607: The home hub controls the IoT device based on the identity credential that is of the second device and that is formed by the public key information of the second device and the private key information of the second device.

In this embodiment of this application, the control device 10 configures a set of identity credential in the home hub 30, so that the control device 10 is bound to the home hub 30 and controls the IoT device 40 through the home hub 30. In a subsequent special case, the control device 20 configures another set of identity credential in the home hub 30, so that the control device 20 controls some special IoT devices 40 through the home hub 30.

Figure 7:
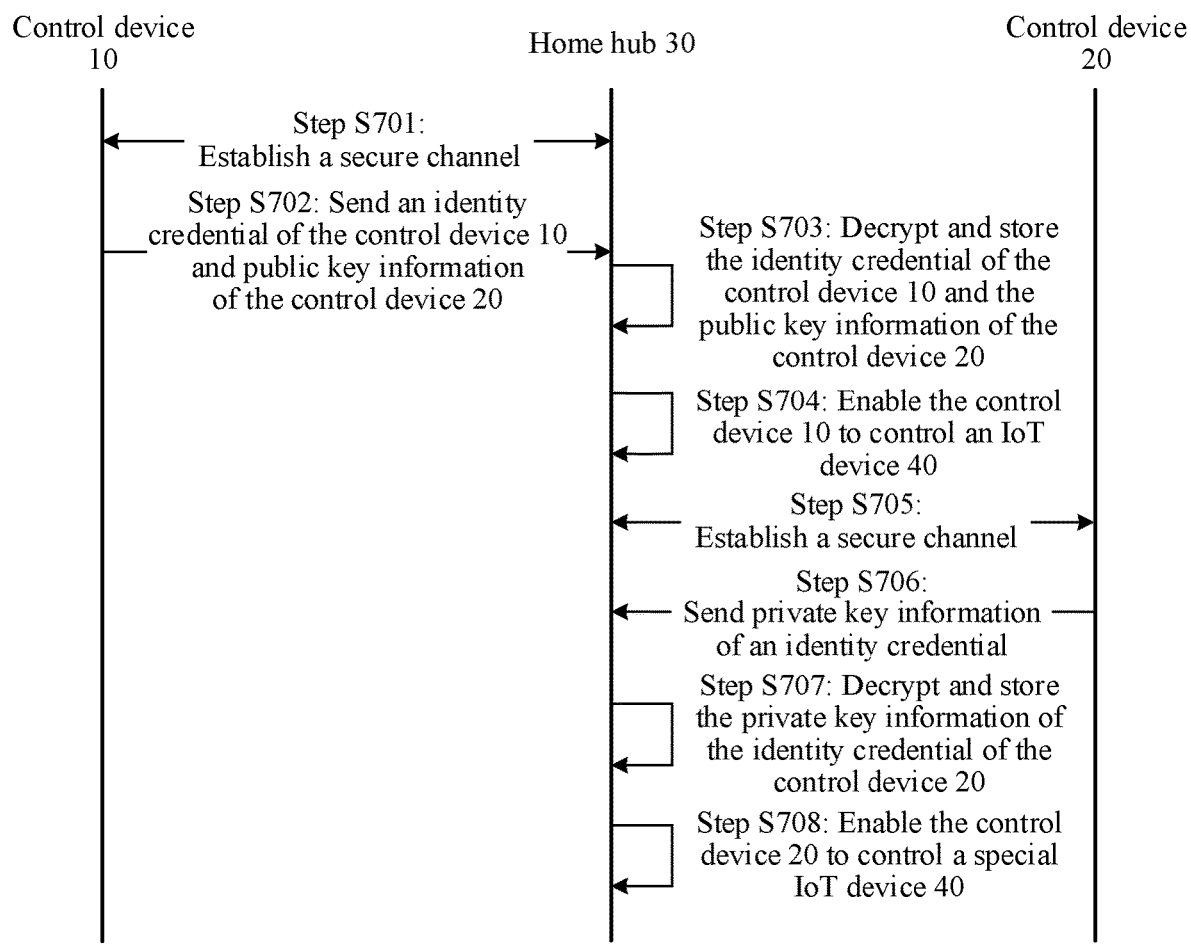
FIG. 7 is a flowchart of another process of binding a control device and a home hub according to an embodiment of this application.

FIG. 7 is a flowchart of another process of binding a control device and a home hub according to an embodiment of this application. As shown in FIG. 7, a specific process of binding the control device 10 and the home hub 30 is as follows:

Step S701: The control device 10 establishes a secure channel with the home hub 30.

It should be specially noted that, in the foregoing process of describing step S301, it has been described in detail that in this embodiment of this application, two sets of identity credential are used as identity credentials of the control device 10 of a same device vendor that produces the home hub 30 and the control device 20 of a different device vendor that produces the home hub 30, so that the control device 10 performs identity authentication by using one set of identity credential in a process of connecting to the home hub 30, and the control device 20 performs identity authentication by using another set of identity credential in a process of connecting to the home hub 30. Therefore, details are not described herein again.

In this embodiment of this application, before the control device 10 is bound to the home hub 30, a connection needs to be established between the control device 10 and the home hub 30. Because the control device 10 and the home hub 30 are connected to the control device through near field/remote communication, there is a risk of being attacked. Therefore, a secure channel needs to be established between the control device 10 and the home hub 30, to protect security of sending data between the control device 10 and the home hub 30.

In an embodiment that may be implemented, a secure encrypted channel is established between the control device 10 and the home hub 30 by using a PAKE protocol. For a specific establishment process, refer to FIG. 4 and descriptions of corresponding steps. The control device 20 in the embodiment shown in FIG. 4 may be replaced with the control device 10. In this embodiment of this application, the secure channel is established by using the PAKE protocol, to ensure security of sending data by the control device 10 to the home hub 30.

Step S702: The control device 10 sends an identity credential of the control device 10 and public key information of an identity credential of the control device 20 to the home hub 30 through the secure channel. Specifically, after encrypting the identity credential of the control device 10 and the public key information of the control device 20 by using the shared key, the control device 10 sends the encrypted identity credential of the control device 10 and public key information of the control device 20 to the home hub 30.

In this embodiment of this application, before the control device 10 is bound to the home hub 30, the control device 10 obtains public key information of another set of identity credential (that is, the public key information of the identity credential of the control device 20) through an IoT cloud server, to perform identity authentication on the control device 20 when a control device (namely, the control device 20) produced by another device vendor is subsequently connected to the home hub 30.

In this embodiment of this application, after the secure channel is established between the control device 10 and the home hub 30 by using the PAKE protocol, the control device 10 encrypts the identity credential to be bound and the public key information of the identity credential of the control device 20 by using the shared key, to generate a ciphertext, and then sends the ciphertext to the home hub 30, to ensure security of sending the identity credential by the control device 10 to the home hub 30.

In an embodiment that may be implemented, the IoT cloud server may further send private key information of the identity credential of the control device 20 to the control device 10. Because the control device 10 and the home hub 30 are devices protected by a same TEE platform, a leakage risk of the control device 10 is low and security of the control device 10 is higher. Therefore, the private key information of the control device 20 may be downloaded to the control device 10 for storage. In this case, the control device 10 directly encrypts the two sets of identity credential, to generate a ciphertext, and then sends the ciphertext to the home hub 30. After receiving the ciphertext, the home hub 30 performs decryption and then stores the ciphertext in a secure storage unit, and directly performs step S708.

Step S703: The home hub 30 decrypts and stores the identity credential of the control device 10 and the public key information of the identity credential of the control device 20.

After receiving the ciphertext generated through encryption by using the shared key, the home hub 30 needs to decrypt the ciphertext. In this embodiment of this application, the home hub 30 decrypts the ciphertext by using the shared key, to obtain the identity credential of the control device 10 and the public key information of the identity credential of the control device 20. Then, the home hub 30 stores the identity credential of the control device 10 and the public key information of the identity credential of the control device 20 that are obtained after decryption in the secure storage unit, to implement the binding between the control device 20 and the home hub 30.

In this case, the home hub 30 already stores the identity credential of the control device 10, and the home hub 30 may send a control instruction to the IoT device 40, to implement a connection between the control device 10 and the IoT device 40 and control the IoT device 40.

The identity credential of the control device 10 and the public key information of the control device 20 that are stored in the secure storage unit of the home hub 30 cannot be modified, unless information of the IoT device 40 is deleted from the home hub 30 or factory settings are restored.

Step S704: The control device 10 controls the IoT device 40 through the home hub 30.

After the control device 10 is bound to the home hub 30, the home hub 30 already stores the identity credential of the control device 10, and the home hub 30 may use the identity credential of the control device 10 when communicating with the IoT device 40, to implement a connection between the control device 10 and the IoT device 40, control a status of the IoT device 40, and receive a status event reported by the IoT device 40.

Step S705: The control device 20 establishes a secure channel with the home hub 30.

Step S705 may be performed in the following two cases: in one case, when the IoT device 40 connected to the home hub 30 needs to be jointly controlled by using the control device 10 and the control device 20; and in another case, when some IoT devices cannot be controlled by the control device 10.

In a process in which the home hub 30 is connected to the control device 20, the control device 20 does not need to be bound to the home hub 30 again. As long as the home hub 30 stores the identity credential of the control device 20, the control device 20 can control the IoT device 40 through the home hub 30.

In this embodiment of this application, in a process of transmitting data between the control device 20 and the home hub 30, because the control device 20 and the home hub 30 are connected to the control device through near field/remote communication, there is a risk of being attacked. Therefore, a secure channel needs to be established between the control device 20 and the home hub 30, to protect security of sending data between the control device 20 and the home hub 30.

In an embodiment that may be implemented, a secure encrypted channel is established between the control device 20 and the home hub 30 by using an STS protocol. For a specific establishment process, refer to FIG. 5 and descriptions of corresponding steps. The control device 10 in the descriptions may be replaced with the control device 20. In this embodiment of this application, the secure channel is established by using the STS protocol, to ensure security of sending the private key information by the control device 20 to the home hub 30.

In this application, in a process of establishing the secure channel by using the STS protocol, the public key information of the identity credential of the control device 20 stored in the secure storage unit in the home hub 30 is used to attempt to verify an identity of the control device that establishes the secure channel with the home hub 30, to determine whether the control device is the control device 20 protected by a different TEE platform from the home hub 30. If the control device is the control device 20 protected by a different TEE platform from the home hub 30, the secure channel is established between the home hub 30 and the control device 20. If the control device is not the control device 10 protected by a different TEE platform from the home hub 30, no secure channel is established between the home hub 30 and the control device.

Step S706: The control device 20 sends the private key information of the identity credential of the control device 20 to the home hub 30 through the secure channel established in step S705.

In the binding process of the home hub 30, the control device 10 has sent and stored the public key information of the identity credential of the control device 20 in the home hub 30. Therefore, in this case, the control device 20 only needs to send the private key information.

In this embodiment of this application, in a process in which after the secure channel is established between the control device 20 and the home hub 30 by using the STS protocol, and the private key information of the identity credential of the control device 20 is sent to the home hub 30, the control device 10 encrypts the private key information of the identity credential of the control device 20 by using the shared key, to generate a ciphertext, and then sends the ciphertext to the home hub 30, to ensure security of sending the identity credential by the control device 20 to the home hub 30.

Step S707: The home hub 30 decrypts and stores the private key information of the identity credential of the control device 20.

After receiving the ciphertext generated through encryption by using the shared key, the home hub 30 needs to decrypt the ciphertext. In this embodiment of this application, the home hub 30 decrypts the ciphertext by using the shared key, to obtain the private key information of the identity credential of the control device 20. Then, the home hub 30 stores the decrypted private key information of the identity credential of the control device 20 in the secure storage unit, to form the identity credential of the control device 20 in the home hub 30.

Step S708: The control device 20 controls a special IoT device 40 through the home hub 30.

When the user logs in with an account only on an APP in the control device 20, the control device 20 controls the IoT device 40 through the home hub 30. If the user logs in with the account on both the APP in the control device 10 and an APP in the control device 20, the home hub 30 stores two sets of identity credential. Because the private key information of the control device 10 is protected and stored based on the same TEE platform as the home hub 30, a security risk of the control device 10 is low. Because the private key information of the control device 20 is protected based on the security capability interface of the operating system, a security risk is higher than that of the control device 10. Therefore, a permission of the identity credential of the control device 10 is higher than that of the identity credential of the control device 20. The home hub 30 preferably selects the identity credential of the control device 10 with a higher identity credential permission, so that the control device 10 controls the IoT device 40 that can be controlled by the control device 10, and the control device 20 controls the IoT device 40 that cannot be controlled by the control device 10.

When the control device 20 is used to control the IoT device, a display UI operation may be performed. In an embodiment that may be implemented, when the control device 20 is connected to the home hub 30, the user is prompted whether to set permissions of some IoT devices 40 that need to be controlled by the control device 20 to the permission of the control device 20. If the user selects yes, the private key information of the identity credential of the control device 20 is sent to the home hub 30.

In this embodiment of this application, the control device 10 configures a set of identity credential in the home hub 30, so that the control device 10 is bound to the home hub 30 and controls the IoT device 40 through the home hub 30. In a subsequent special case, the control device 20 configures another set of identity credential in the home hub 30, so that the control device 20 controls some special IoT devices 40 through the home hub 30.

An embodiment of this application further provides a control system. The system includes the control device 10, the control device 20, the home hub 30, and the at least one IoT device 40 described in the foregoing embodiments.

Figure 8:
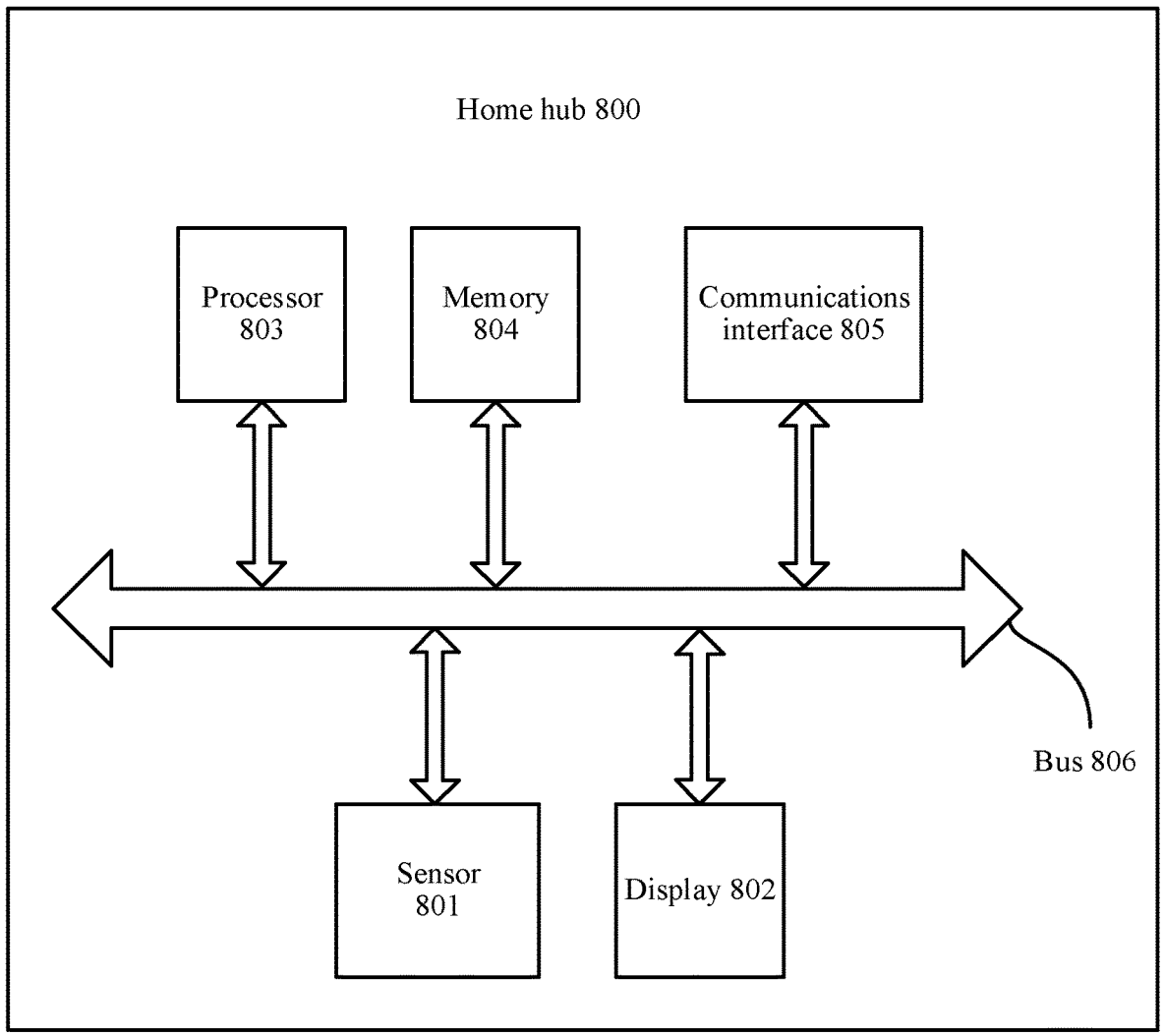
FIG. 8 is a schematic structural diagram of a home hub according to an embodiment of this application.

FIG. 8 is a schematic structural diagram of a home hub according to an embodiment of the present disclosure. A home hub 800 shown in FIG. 8 includes a sensor 801, a display 802, a processor 803, a memory 804, a communications interface 805, and a bus 806. The processor 803, the memory 804, and the communications interface 805 in the home hub 800 may establish a communication connection through the bus 806.

The sensor 801 is configured to obtain identity credentials including an identity credential of the control device 10 and an identity credential of the control device 20. The sensor 801 may include a camera and the like.

The display 802 is configured to display processed data, such as a video or a virtual operation interface.

The processor 803 may be a central processing unit (CPU).

The memory 804 may include a volatile memory, for example, a random-access memory (RAM); the memory may also include a nonvolatile memory, for example, a read-only memory (ROM), a flash memory, a hard disk drive (HDD), or a solid state-drive (SSD); and the memory 804 may further include a combination of the foregoing types of memories.

The control method provided in the foregoing embodiments is executed by the home hub 800. Data such as an identity credential, public key information, and private key information is stored in the memory 804. In addition, the memory 804 is further configured to store program instructions or the like corresponding to the remote control method described in the foregoing embodiments.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

In addition, aspects or features in the embodiments of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD)), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software function unit and sold or used as an independent product, the functions may be stored in a computer-readable storage medium. Based on such an understanding, the technical solutions of this application may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A control method implemented by a home hub having a first trusted execution environment (TEE) platform, the control method comprising:
   receiving, from a second device that has a second TEE platform, a first identity credential of the second device and first public key information of a second identity credential of a first device having the first TEE platform, wherein the first identity credential comprises second public key information of the second device and first private key information of the second device;
   controlling at least one internet of things (IoT) device based on the first identity credential;
   receiving, from the first device, second private key information of the second identity credential; and
   controlling the at least one IoT device based on the second identity credential,
   wherein the second identity credential comprises the first public key information and the second private key information.

2. The control method of claim 1, wherein before receiving the first identity credential and the second public key information, the control method further comprises:
   receiving a PAKE protocol negotiation from the second device; and
   establishing a secure encrypted channel with the second device, and
   wherein the first identity credential and the first public key information that are received from the second device are encrypted.

3. The control method of claim 2, further comprising:
   decrypting the first identity credential to generate a decrypted first identity credential;
   decrypting the first public key information to generate decrypted first public key information; and
   storing, in a secure storage in the home hub, the decrypted first identity credential and the decrypted first public key information.

4. The control method of claim 1, wherein before receiving the second private key information, the control method further comprises:
   receiving an STS protocol negotiation from the first device;
   attempting to verify an identity of the first device using the first public key information; and
   establishing, when the home hub verifies the identity of the first device, a secure encrypted channel with the first device,
   wherein the second private key information that is received from the first device is encrypted, and
   wherein the second private key information is received via the secure encrypted channel.

5. The control method of claim 4, further comprising:
   decrypting the second private key information to generate decrypted second private key information; and
   storing the decrypted second private key information in a secure storage in the home hub.

6. A home hub, comprising:
   memory configured to store one or more programs; and
   a processor coupled to the memory and configured to execute the one or more programs to cause the home hub to:
   receive, from a second device, a first identity credential of the second device and first public key information of a second identity credential of a first device, wherein the first identity credential comprises second public key information of the second device and first private key information of the second device;
   control at least one internet of things (IoT) device based on the first identity credential;
   receive, from the first device, second private key information of the second identity credential; and
   control the at least one IoT device based on the second identity credential,
   wherein the second identity credential comprises the first public key information and the second private key information.

7. The home hub of claim 6, wherein the first identity credential and the first public key information that are received from the second device are encrypted, and wherein when executed by the processor, the one or more programs further cause the home hub to:
   receive a PAKE protocol negotiation from the second device; and
   establish a secure encrypted channel with the second device; and
   receive, via the secure encrypted channel, the first identity credential and the first public key information.

8. The home hub of claim 7, wherein when executed by the processor, the one or more programs further cause the home hub to:
   decrypt the first identity credential to generate a decrypted first identity credential;
   decrypt the first public key information to generate decrypted first public key information; and
   store, in a secure storage in the home hub, the decrypted first identity credential and the decrypted first public key information.

9. The home hub of claim 6, wherein the second private key information that is received from the first device is encrypted, and wherein when executed by the processor, the one or more programs further cause the home hub to:

receive an STS protocol negotiation from the first device;
attempt to verify an identity of the first device using the first public key information;
establish a secure encrypted channel with the first device when the home hub verifies the identity of the first device; and
receive the second private key information via the secure encrypted channel.

10. The home hub of claim 9, wherein when executed by the processor, the one or more programs further cause the home hub to:
decrypt the second private key information to generate decrypted second private key information; and
store the decrypted second private key information in a secure storage in the home hub.

11. The home hub of claim 6, wherein the home hub has a first trusted execution environment (TEE) platform, and wherein the first device has the first TEE platform.

12. The home hub of claim 11, wherein the second device has a second TEE platform.

13. A control system, comprising:
at least one internet of things (IoT) device;
a home hub having a first trusted execution environment (TEE) platform and configured to:
receive, from a second device having a second TEE platform, a secure channel establishment protocol when the second device logs into an IoT application program for a first time, wherein the IoT application program is for controlling the home hub and the at least one IoT device;
establish, according to the secure channel establishment protocol, a secure channel with the second device;
receive, via the secure channel and from the second device, a first identity credential of the second device and first public key information of a second identity credential of the first device; and
control the at least one IoT device based on the first identity credential; and
a first device having the first TEE platform and configured to log in to the IoT application program,
wherein the home hub is further configured to:
attempt to verify an identity of the first device based on the first public key information when the first device logs in to the IoT application program;
receive, from the first device and after verifying the identity, private key information of the second identity credential of the first device; and
control the at least one IoT device based on the second identity credential,
wherein the second identity credential comprises the first public key information and the private key information.

14. The control system of claim 11, wherein the home hub is further configured to:
receive a control instruction from the first device; and
control, responsive to receiving the control instruction, the at least one IoT device based on the second identity credential and further according to the control instruction.

15. The control system of claim 11, wherein the home hub is further configured to:
receive a control instruction from the second device; and
control, responsive to receiving the control instruction, the at least one IoT device based on the first identity credential and further according to the control instruction.

16. The control system of claim 11, wherein the secure channel establishment protocol comprises a PAKE protocol.

17. The control system of claim 11, wherein the secure channel establishment protocol comprises an STS protocol.

18. The control system of claim 11, wherein the first identity credential that is received from the second device is encrypted.

19. The control system of claim 18, wherein the first public key information that is received from the second device is encrypted.

20. The control system of claim 19, wherein the home hub is further configured to decrypt the first identity credential and the first public key information.

* * * * *

UNITED STATES PATENT AND TRADEMARK OFFICE
CERTIFICATE OF CORRECTION

| | |
|---|---|
| PATENT NO. | : 12,010,105 B2 |
| APPLICATION NO. | : 17/684820 |
| DATED | : June 11, 2024 |
| INVENTOR(S) | : Lu Gan et al. |

Page 1 of 1

It is certified that error appears in the above-identified patent and that said Letters Patent is hereby corrected as shown below:

On the Title Page

Page 2 Column 2, (56) References Cited, Foreign Patent Documents: "IN 107124433 A 9/2017" should read "CN 107124433 A 9/2017"

Signed and Sealed this
Sixth Day of August, 2024

Katherine Kelly Vidal
*Director of the United States Patent and Trademark Office*